United States Patent
Patel et al.

(10) Patent No.: US 10,654,966 B2
(45) Date of Patent: May 19, 2020

(54) LOW-VISCOSITY PHOSPHATE POLYOLS

(71) Applicant: Elé Corporation, McCook, IL (US)

(72) Inventors: Yogi Patel, Bartlett, IL (US); Floy Pelletier, Homer Glen, IL (US); Edward L Eubank, Darien, IL (US); Mark Listemann, La Grange Park, IL (US)

(73) Assignee: ELÉ CORPORATION, McCook, IL (US)

(*) Notice: Subject to any disclaimer, the term of this patent is extended or adjusted under 35 U.S.C. 154(b) by 72 days.

(21) Appl. No.: 15/792,462

(22) Filed: Oct. 24, 2017

(65) Prior Publication Data

US 2018/0112027 A1     Apr. 26, 2018

Related U.S. Application Data

(60) Provisional application No. 62/412,476, filed on Oct. 25, 2016.

(51) Int. Cl.
| | | |
|---|---|---|
| *C08G 18/09* | (2006.01) | |
| *C08G 18/16* | (2006.01) | |
| *C08G 18/18* | (2006.01) | |
| *C08G 18/22* | (2006.01) | |
| *C08G 18/38* | (2006.01) | |
| *C08G 18/40* | (2006.01) | |
| *C08G 18/42* | (2006.01) | |
| *C08G 18/50* | (2006.01) | |
| *C08G 18/66* | (2006.01) | |
| *C08G 18/76* | (2006.01) | |
| *C08J 9/00* | (2006.01) | |
| *C08J 9/14* | (2006.01) | |
| *C08K 5/521* | (2006.01) | |
| *C08L 75/06* | (2006.01) | |
| *C08G 101/00* | (2006.01) | |

(52) U.S. Cl.
CPC ....... *C08G 18/3885* (2013.01); *C08G 18/092* (2013.01); *C08G 18/163* (2013.01); *C08G 18/1808* (2013.01); *C08G 18/225* (2013.01); *C08G 18/4018* (2013.01); *C08G 18/4208* (2013.01); *C08G 18/5075* (2013.01); *C08G 18/6633* (2013.01); *C08G 18/7664* (2013.01); *C08J 9/0038* (2013.01); *C08K 5/521* (2013.01); C08G 2101/0025 (2013.01); C08G 2105/02 (2013.01); *C08J 9/141* (2013.01); *C08J 2201/022* (2013.01); *C08J 2203/14* (2013.01); *C08J 2205/10* (2013.01); *C08J 2375/06* (2013.01)

(58) Field of Classification Search
CPC ............ C08G 18/3885; C08G 18/5075; C08J 9/0038; C08K 5/521
See application file for complete search history.

(56) References Cited

U.S. PATENT DOCUMENTS

| | | | |
|---|---|---|---|
| 3,639,542 A | 2/1972 | Pizzini et al. | |
| 5,264,463 A | 11/1993 | Barthelemy | |
| 5,837,742 A | 11/1998 | Fishback | |
| 6,140,383 A * | 10/2000 | Soukup | B29C 44/304 521/155 |
| 6,211,257 B1 * | 4/2001 | Kaplan | C08G 18/4018 521/125 |
| 6,372,811 B2 * | 4/2002 | Singh | C08G 18/4208 521/131 |
| 2005/0159500 A1 * | 7/2005 | Dreier | C08G 18/3885 521/174 |
| 2011/0152392 A1 * | 6/2011 | Van Der Puy | C08G 18/1875 521/87 |
| 2014/0113984 A1 | 4/2014 | Burdeniuc et al. | |
| 2014/0206786 A1 * | 7/2014 | Xu | C08G 18/546 521/173 |
| 2015/0057384 A1 | 2/2015 | Glos et al. | |

FOREIGN PATENT DOCUMENTS

| | | | | |
|---|---|---|---|---|
| GB | 1036999 A * | 7/1966 | ............... | C07F 9/08 |
| WO | 2012163279 | 12/2012 | | |

OTHER PUBLICATIONS

International Search Report issued in connection with PCT/US17/58108 dated Dec. 26, 2017.

* cited by examiner

*Primary Examiner* — Melissa A Rioja
(74) *Attorney, Agent, or Firm* — Timothy M. McCarthy; Clark Hill PLC

(57) ABSTRACT

A novel phosphate polyol formulation is described, comprising a polyester polyol, a flame retardant comprising a phosphate polyol, a blowing agent, a catalyst, a surfactant, and a fire-retardant aromatic isocyanate. A further embodiment includes a phosphorus compound, such as a phosphate, a phosphate ester, or an alkyl phosphate such as triethyl phosphate.

5 Claims, No Drawings

LOW-VISCOSITY PHOSPHATE POLYOLS

PRIORITY

This application claims priority from U.S. Provisional Patent Application No. 62/412,476, filed Oct. 25, 2016, the disclosure of which is incorporated herein by reference.

FIELD OF THE INVENTION

Polyurethanes and other synthetic and natural polymers are flammable, which poses hazards in practical applications of these materials. Fire retardants are typically required to meet flammability standards for polymeric materials. Many fire retardants contain halogens, but there is a growing interest in more environmentally friendly non-halogenated alternatives. Embodiments of the invention comprise improved halogen-free phosphorus polyol compositions which can be readily incorporated into polymers for use as fire retardants. Other embodiments of the invention also comprise formulations based on the improved phosphate polyols which offer improved fire retardant performance relative to the polyol itself. Yet other embodiments of the invention comprise polyurethane foams made from the improved phosphorus-polyol-containing formulations which show decreased mass loss when exposed to fire and improved char formation.

BACKGROUND OF THE INVENTION

The prior art indicates that polyurethane foams made from phosphate polyols have desirable fire properties, but achieving this property requires replacing all of the polyol originally used in the foam formulation with the phosphate polyol. This high level of substitution is uneconomic and may negatively impact foam physical properties. The prior art also indicates that phosphate polyols may be incorporated into aqueous emulsions as components of fire retardant polyurethane coatings. While phosphorus-containing fire retardants are well known in the art of polyurethane foam, a need exists for low-viscosity materials which are effective at use levels comparable to those of current state-of-the-art fire retardants, as well as for low-viscosity non-halogenated materials with both burning and thermal stability performance comparable to that of current halogenated fire retardants.

While numerous non-halogen phosphorus-containing fire retardants for rigid polyurethane foam are known, the prior art provides essentially no guidance on how to optimize the fire retardant for both fire and char performance while maintaining convenient handling properties and use levels comparable to those of conventional halogenated phosphates.

The following United States patents provide the background of the invention:

The addition of propylene oxide to phosphoric acid while controlling temperature below 95 F (35 C) resulted in a phosphate ester (U.S. Pat. No. 2,372,244).

The addition of more than three moles of alkylene oxide on average per phosphate hydroxyl requires boron and tin catalysts (U.S. Pat. No. 3,317,638).

The preparation of phosphate polyols from phosphoric acid containing 12-28% water requires subsequent water removal to be suitable for rigid polyurethane foam applications (U.S. Pat. No. 3,317,639).

The preparation of phosphate polyols from phosphoric acid and halogenated epoxides including epichlorohydrin has been disclosed (U.S. Pat. No. 3,281,502). Phosphate polyol use levels are high, from 40-85 wt % of the overall polyol mass.

The addition of phosphoric acid to alkylene oxides for use as polyurethane flame retardants involves a highly exothermic reaction, which is difficult to manage on an industrial scale (U.S. Pat. No. 3,393,254).

Phosphate polyols can be prepared from phosphoric acid and alkylene oxides in the presence of polyether polyols, but extended reaction times are required and the phosphorus content is very low, less than about 2% (U.S. Pat. No. 3,639,543).

Phosphate polyols derived from the reaction of ethylene oxide with phosphoric acid are known as components of fire retardant rigid polyurethane foams (U.S. Pat. No. 4,051,082). The polyurethane foams prepared from the inventive phosphate polyols require high isocyanate index and 15-80 wt % of the phosphate polyol relative to total polyol.

Phosphate esters lacking hydroxyalkyl functionality will not react readily into polyurethane foams (U.S. Pat. No. 6,512,133).

Phosphate polyols can be incorporated into polyurethane prepolymer-based aqueous emulsions for use as flame retardant coatings (U.S. Published Patent Application No. 2013/0203936).

Polyols of the present invention can be combined with phosphorus-based fire retardants. Examples of phosphorus compound used in fire retardants include U.S. Pat. No. 9,023,925 to Qi, Phosphorus-Containing Flame Retardants for Polyurethane Foams; U.S. Pat. No. 9,718,937 to Dai, Inherent Flame Retardant Rigid Polyurethane Foam; U.S. Pat. No. 8,846,967 to Hansel, Process for Preparing Alkyl Phosphates; and U.S. Pat. No. 8,703,853 to Kasowski, Flame Retardant and Compositions Containing It; the disclosure of each of which is incorporated herein.

SUMMARY OF THE INVENTION

The phosphate polyols of the preferred embodiment of the present invention are made from the reaction of phosphoric acid with alkylene oxides, most preferably propylene oxide, with the optional presence of additional alkylene-oxide-based polyols as described in the prior art.

The novel phosphate polyol formulations of another embodiment of the present invention are made from mixtures of the phosphate polyol with a polyester polyol and a blowing agent, a catalyst, a surfactant, and an aromatic isocyanate. In another embodiment, the phosphate polyol formulation also has phosphorus compounds lacking isocyanate-reactive functionality, such as a phosphate ester.

In one aspect, the preferred embodiment of the present invention comprises a phosphate polyol prepared by a process comprising the steps of heating phosphoric acid, charging propylene oxide, charging a non-isocyanate-reactive compound having a fire-retardant property, such as a phosphate, for example, and sparging with nitrogen. In another preferred embodiment, the present invention comprises a phosphate polyol formulation comprising a modified aromatic polyester, a phosphate polyol, a blowing agent, a catalyst, a surfactant, an aromatic isocyanate, and a phosphorus compound. In another embodiment, the present invention comprises a foam comprising the phosphate polyol formulation.

DETAILED DESCRIPTION OF THE ILLUSTRATED EMBODIMENTS

While the invention may be susceptible to embodiment in different forms, there will be described in detail specific embodiments with the understanding that the present disclosure is to be considered an exemplification of the principles of the invention, and is not intended to limit the invention to that as illustrated and described herein.

The invention provides phosphate polyols with lower viscosity, high phosphorus content and hydroxyl numbers similar to those of commonly-used polyols. The invention minimizes the impact on foam formulation processing and foam physical properties, which simplifies incorporation into existing formulations. Use levels are comparable to those of existing fire retardants, as are mass and shape retention when exposed to flame.

The formulated phosphate polyols of the preferred embodiment of the present invention provide acceptable weight loss and improved shape retention for polyurethane foams exposed to fire conditions, thus limiting fire spread. The phosphate polyol compositions also provide improved thermal stability to limit generation of volatile species that can provide additional fuel for a fire.

The invention is useful for rigid polyurethane foam, with applicability to flexible foams and other synthetic and natural polymers.

The invention provides low-viscosity phosphate polyol compositions which allow for the simultaneous optimization of rigid foam fire performance and char formation, while minimizing the impact on foam formulation processing. Use levels are comparable to those of existing halogenated fire retardants, as are char formation and mass and shape retention when exposed to flame.

Phosphate polyol compositions were produced according to the following examples.

Example 1

Charge 1480 g of phosphoric acid to a 20 L reactor, heat to 35-40 C with stirring, and heat for 1 hour. Charge 5200 g of propylene oxide and nitrogen sparge to remove unreacted propylene oxide.

Final polyol product has OH #362, color Gardner 5.5, viscosity 820 cps and % phosphorus 6.7.

Optionally, produce a formulation for even more improved fire retardant performance by blending phosphate polyol prepared via prior art methods as indicated above with an appropriate quantity of a non-isocyanate-reactive compound having a fire-retardant property, preferably a phosphate, more preferably a trialkyl phosphate, most preferably triethyl phosphate, to produce the inventive compositions (Table 3, below).

Example 2

Polyurethane foams were prepared from the formulations in Table 1.

TABLE 1

Rigid Foam Formulations to Evaluate Phosphate Polyols

| | Product | Chemical | PPHP |
|---|---|---|---|
| Polyol | Stepanpol PS-2352 | Modified aromatic polyester | 100 |
| Flame retardant | Fyrol PCF | Tris (1-chloro-2-propyl) phosphate (TCPP) | Various |
| Flame retardant | Inventive phosphate polyol | Phosphate polyol composition | Various |

TABLE 1-continued

Rigid Foam Formulations to Evaluate Phosphate Polyols

| | Product | Chemical | |
|---|---|---|---|
| Blowing agent | Water | | 0.50 |
| Catalyst | PEL-CAT 9540-A | Potassium octoate in diethylene glycol | 4.50 |
| Catalyst | PEL-CAT 9749-A | Pentamethyldiethylene triamine (PMDETA) | 0.19 |
| Silicone surfactant | PEL-SIL 9920 | Silicone polyether surfactant | 1.17 |
| Blowing agent | 2-Me Butane | i-Pentane | 23.20 |
| | | | Index |
| Isocyanate (MDI) | Mondur 489 | Aromatic isocyanate | 280 |

Stepanpol PS-2352 polyester polyol OH# 237 available from Stepan.
Fyrol PCF available from ICL.
PEL-CAT 9540-A, PEL-CAT 9749-A and PEL-SIL 9920 available from Ele' Corporation.
Mondur 489 (30.8% NCO) available from Covestro.

The foams for burn testing were prepared as follows. The polyol, flame retardant(s), water, catalysts and surfactant (B side) were premixed and allowed to incubate at 25 C for at least 24 hours prior to foam preparation. The isocyanate and pentane blowing agent (A side) were weighed into a capped jar and incubated for at least one hour prior to foam preparation. The B side mixture was weighed into a tared 32-ounce paperboard cup. The A side mixture was shaken vigorously for 25 seconds and rapidly weighed into the paperboard cup. The cup was mixed at 3000 rpm for six seconds and the foam was allowed to rise freely. The foam was cured at 25 C for a minimum of 24 hours before being cut into pieces for burn testing as specified in ASTM D-635.

Burn testing was conducted according to a method based on ASTM D-635. The method was modified to use a propane flame (flame temperature in air 1967 C) instead of a natural gas flame (methane flame temperature in air 1950 C). Three to four foam samples were burned for 30 seconds and the weight loss values averaged. Results are shown in Table 2. All samples were self-extinguishing prior to removal of the flame after 30 seconds.

TABLE 2

Phosphate Polyol Burn Test

| Flame retardant | Exp. 1 Control | Exp. 2 No FR | Exp. 3 | Exp. 4 |
|---|---|---|---|---|
| TCPP (pphp) | 7.5 | 0.0 | 0.0 | 0.0 |
| Phosphate polyol (pphp) | 0.0 | 0.0 | 7.5 | 15.0 |
| % Mass Loss | 16.5 | 54.2 | 34.5 | 30.0 |

Experiment 1 is the TCPP control. Experiment 2 with no flame retardant shows considerably more mass loss as expected. Experiments 3 and 4 show that the phosphate polyol is not as effective as the halogenated control, but is appreciably more effective than no fire retardant (Experiment 2). The phosphate polyol is halogen-free and is incorporated into the polymer network, which helps to maintain physical properties.

Performance of the phosphate polyol can be further improved by adding a non-isocyanate-reactive compound having a fire-retardant property, such as a phosphorus compound to the Table 1 formulation. The non-isocyanate-reactive compound can be a phosphate, a phosphate ester, or an alkyl phosphate, such as, for example, trialkyl phosphate. The results are shown in Table 3.

TABLE 3

Phosphate Polyol/Triethyl Phosphate (TEP) Burn Test

| Flame retardant | Exp. 1 Control | Exp. 2 | Exp. 3 | Exp. 4 | Exp. 5 | Exp. 6 | Exp. 7 | Exp. 8 |
|---|---|---|---|---|---|---|---|---|
| TCPP (pphp) | 7.50 | 0.00 | 0.00 | 0.00 | 0.00 | 0.00 | 0.00 | 0.00 |
| Phosphate polyol (pphp) | 0.00 | 6.75 | 6.00 | 5.25 | 0.00 | 13.50 | 12.00 | 10.50 |
| Triethyl phosphate (pphp) | 0.00 | 0.75 | 1.50 | 2.25 | 7.50 | 1.50 | 3.00 | 4.50 |
| Weight ratio phosphate polyol:TEP | — | 90:10 | 80:20 | 70:30 | — | 90:10 | 80:20 | 70:30 |
| Total FR (pphp) | 7.50 | 7.50 | 7.50 | 7.50 | 7.50 | 15.00 | 15.00 | 15.00 |
| % Mass Loss | 14.5 | 33.7 | 27.8 | 18.6 | 11.5 | 26.1 | 19.9 | 10.4 |

Addition of triethyl phosphate brings weight loss in line with that of the control. All samples were self-extinguishing prior to removal of the flame after 30 seconds.

Thermogravimetric analysis (TGA) is a widely-accepted analytical technique that provides an indication of relative thermal stability for a series of materials. TGA was conducted to better understand thermal stability and char formation without direct flame contact.

In this study, a known mass of foam was heated from 30 C-750 C at a steady rate of 20° C./min under nitrogen at 40 ml/min. (Thermal stability is expressed as percent retention of foam weight at a particular temperature relative to the foam's initial weight at 30 C. See, for example, U.S. Pat. No. 8,916,620, Process for polyurethane-modified polyisocyanurate foam with improved thermal stability, the disclosure of which is incorporated herein by reference.)

TABLE 4

Phosphate Polyol/Triethyl Phosphate Thermogravimetric Analysis

| Flame retardant | Exp. 1 Control | Exp. 2 | Exp. 3 | Exp. 4 |
|---|---|---|---|---|
| TCPP (pphp) | 7.50 | 0.00 | 0.00 | 0.00 |
| Phosphate polyol (pphp) | 0.00 | 5.25 | 0.00 | 7.50 |
| Triethyl phosphate (pphp) | 0.00 | 2.25 | 7.50 | 0.00 |
| Weight ratio phosphate polyol:TEP | — | 70:30 | — | — |
| Total FR (pphp) | 7.50 | 7.50 | 7.50 | 7.50 |
| % Mass retained 300 C | 95.3 | 94.6 | 81.0 | 94.0 |
| % Mass retained 400 C | 66.7 | 65.6 | 58.9 | 63.7 |
| % Mass retained 500 C | 58.2 | 60.4 | 51.1 | 57.4 |
| % Mass retained 600 C | 47.3 | 53.5 | 35.0 | 52.2 |
| % Mass retained 700 C | 30.8 | 40.8 | 8.7 | 44.9 |
| % Mass retained 745 C | 23.5 | 34.9 | 0.0 | 41.4 |

The TCPP control (Table 4, Experiment 1) displays good mass retention up to 500 C but accelerating mass loss above 500 C. The TCPP control (Tables 2 and 3, experiment 1) also displays low mass loss when exposed directly to a flame, thus demonstrating a good balance between flame resistance and thermal stability.

An inventive phosphate polyol/triethyl phosphate composition (Table 4, Experiment 2) shows mass retention comparable to that of the control up to 500 C and superior mass retention above 500 C. This phosphate polyol/triethyl phosphate composition (Table 3 Experiment 4) shows mass loss close to that of the control when exposed to flame, also demonstrating a good balance between flame resistance and thermal stability.

Triethyl phosphate alone (Table 4, Experiment 3) shows very poor mass retention, especially above 400 C, with complete mass loss by 745 C. However, triethyl phosphate (Table 3, Experiment 5) shows low weight loss when exposed directly to flame.

Phosphate polyol alone (Table 4, Experiment 4) shows good mass retention at all temperatures, but high mass loss (Table 3, Experiments 3 and 4) when exposed directly to flame.

When formulating a multi-component composition with a desired set of target properties, a common strategy is to utilize individual components with a range of properties, with the hope that the average performance for the composition is acceptable. Given the objective of developing a composition that provides good mass retention under both direct flame and thermal resistance conditions, the observation that triethyl phosphate demonstrates very poor mass retention in the TGA experiment would not motivate one skilled in the art to add increasing levels of triethyl phosphate to improve the overall performance of the phosphate polyol.

Increasing triethyl phosphate levels to improve mass retention when exposed to fire would be expected to significantly degrade mass retention under thermal stability conditions. Unexpectedly, we find significant positive synergy between triethyl phosphate and the phosphate polyol in terms of thermal stability relative to the performance of the individual components. Given the numerous phosphorus-based fire retardants known, achieving the desired objectives is not a matter of routine optimization, but rather requires inventive insight to identify synergistic behavior.

While preferred embodiments of the present invention are shown and described, it is envisioned that those skilled in the art may devise various modifications of the present invention without departing from the spirit and scope of the appended claims.

We claim:

1. A phosphate polyol formulation comprising:
   a polyester polyol;
   a halogen-free phosphate polyol;
   a blowing agent;
   a catalyst;
   a surfactant;
   an aromatic isocyanate; and
   a fire-retardant non-isocyanate-reactive compound,
   wherein the fire-retardant non-isocyanate-reactive compound comprises a triethyl phosphate compound and
   wherein a weight ratio of the halogen-free phosphate polyol to the triethyl phosphate compound is approximately 90:10.

2. A phosphate polyol formulation comprising:
a polyester polyol;
a halogen-free phosphate polyol;
a blowing agent;
a catalyst;
a surfactant;
an aromatic isocyanate; and
a fire-retardant non-isocyanate-reactive compound,
wherein the fire-retardant non-isocyanate-reactive compound comprises a triethyl phosphate compound and
wherein a weight ratio of the halogen-free phosphate polyol to the triethyl phosphate compound is approximately 80:20.

3. A phosphate polyol formulation comprising:
a polyester polyol;
a halogen-free phosphate polyol;
a blowing agent;
a catalyst;
a surfactant;
an aromatic isocyanate; and
a halogen-free fire-retardant non-isocyanate-reactive compound,
wherein the halogen-free fire-retardant non-isocyanate-reactive compound comprises a triethyl phosphate compound and
wherein a weight ratio of the halogen-free phosphate polyol to the triethyl phosphate compound is approximately 70:30.

4. A phosphate polyol formulation comprising:
a polyester polyol;
a halogen-free phosphate polyol;
a blowing agent;
a catalyst;
a surfactant;
an aromatic isocyanate; and
a halogen-free fire-retardant non-isocyanate-reactive compound, and
wherein the phosphate polyol formulation comprises 7.5 parts by weight of the halogen-free phosphate polyol per hundred parts by weight of the polyester polyol.

5. A phosphate polyol formulation comprising:
a polyester polyol;
a halogen-free phosphate polyol;
a blowing agent;
a catalyst;
a surfactant;
an aromatic isocyanate; and
a halogen-free fire-retardant non-isocyanate-reactive compound, and
wherein the phosphate polyol formulation comprises 15.0 parts by weight of the halogen-free phosphate polyol per hundred parts by weight of the polyester polyol.

* * * * *